United States Patent Office 3,419,414
Patented Dec. 31, 1968

3,419,414
WEAR-RESISTANT REPELLENT-FINISHED ARTICLE AND PROCESS OF MAKING THE SAME
Harold R. Marks, Kent, Wash., assignor to The Boeing Company, Seattle, Wash., a corporation of Delaware
Continuation-in-part of application Ser. No. 453,367, May 15, 1965. This application Aug. 29, 1966, Ser. No. 575,888
9 Claims. (Cl. 117—70)

ABSTRACT OF THE DISCLOSURE

To a metallic plate-type body such as of a metal bonding tool or a cooking utensil is aplied a wear underlayer containing ceramic oxide over which is applied an overlayer of antiadherent fluorcarbon polymer resin. The underlayer may include a metallic undercoat beneath the ceramic oxide. The underlayer is flame-sprayed, providing a minutely-rugged exterior to anchor the overlayer sprayed as an aqueous suspension. Initially, or after slight wear, the overlayer is sporadically interrupted by a multiplicity of outcroppings of the wear underlayer to provide a wear-resistant repellent finish.

---

This application is a continuation-in-part of my application Ser. No. 453,367, filed May 15, 1965, for an Oxide-Polymer Coating, now abandoned, which was a continuation-in-part of abandoned application Ser. No. 123,644, filed July 13, 1961. This invention relates to an article, such as a bonding tool or a cooking utensil, having a wear-resistant and repellent finish and the process of applying such a finish to the article.

Metal bonding tools, usually of steel or aluminum, are used in shop work as a backing or support for parts of metal, which may be in the form of overlapping sheets, to be bonded together by adhesive such as an epoxy resin. The parts to be bonded are pressed together and held against the backing tool by an air-inflated bag or an evacuated bag, for example, covering the parts to be bonded, and in most instances the parts are held in this manner during a baking operation to cure the adhesive. In such a noperation adhesive frequently is squeezed from between the parts to be bonded as they are pressed together and smears the bonding tool.

One of the difficulties experienced with bonding tools, therefore, has been the smearing of adhesive used in the bonding operation on the bonding tool which may stick the work to the tool so that the work cannot be separated from the tool following the adhesive-curing operation without the risk of damaging the work or the tool or both to a greater or lesser extent, and which is also hard to clean from the tool. To alleviate this sticking problem a parting agent, frequently in the form of a lubricant which may be a liquid, a grease, or a dust, has been applied to the tool. However, such parting agents generally have not been satisfactory since they wear off after the tool has been used a few times so that the bare metal of the tool again is exposed to any adhesive that may be squeezed from the parts being bonded onto the tool during the bonding process.

Another situation where adhesion to an article has been a problem is in the case of metal cooking utensils, such as of sheet steel, aluminum, copper, cast iron or stainless steel. Particularly during baking or frying, various foods tend to stick to a metal cooking vessel. In order to facilitate parting of cooked food from the cooking vessel surface which it contacts such surface has been lubricated with grease, oil, flour, or silicone oil or grease. These materials must be replaced constantly to function effectively, which is expensive, and the lubricant usually adulterates the food.

In an attempt to solve the problem of preventing food from becoming stuck to the surface of a cooking utensil during a cooking operation, the surface of such cooking utensils have been coated with a permanent type of antiadherent or non-stick resin, such as tetrafluoroethylene polymer, frequently designated by the trademark Teflon. It has been recognized, however, that one of the major shortcomings of such coatings is their lack of abrasion resistance. Cookware is subjected to abrasion both by scouring during cleaning and by being scratched with stirring implements.

Accordingly, it is a primary object of this invention to provide a coating finish for a plate-type article which is sufficiently hard to resist scratching and wear and yet which finish will be repellent, that is, it will not have an affinity for adhesives, sticky material or cooking food, so that such material will not adhere to the surface of the finish. It will withstand temperatures of several hundred degrees Fahrenheit for extended periods without any significant amount of deterioration. More specifically, such a finish will have poor wetting characteristics which deters adhesives, paints, plastics and food from sticking to the finish.

It is a further object to provide a process for applying such a wear-resistant repellent finish to metal articles easily, quickly and inexpensively.

Essentially, the plate-type body of the article of the present invention is covered by a flame-sprayed wear layer, which may include one or more coats containing a ceramic oxide having a minutely rugged exterior, over which wear layer is applied permanent antiadherent or non-stick resin penetrating interstices of the wear layer exterior to anchor the antiadherent material to the body and provide a finish, at least following initial wear, which will be both wear resistant and repellent by having its surface sporadically interrupted by a multiplicity of outcroppings of the wear layer distributed throughout the surface of the finish and constituting a minor portion of the finish surface area. The permanent antiadherent material preferably is a fluorocarbon polymer resin such as a polymer of tetrafluoroethylene.

The procedure for making a coated article having the above characteristics may comprise the following steps:

(1) Clean surface contaminants from the article, if necessary.
(2) Roughen the areas to be coated.
(3) Preheat the article, if necessary.
(4) Apply a wear layer including ceramic oxide.
(5) Apply a repellent material layer.
(6) Fuse the repellent layer by baking.

Figure 2:
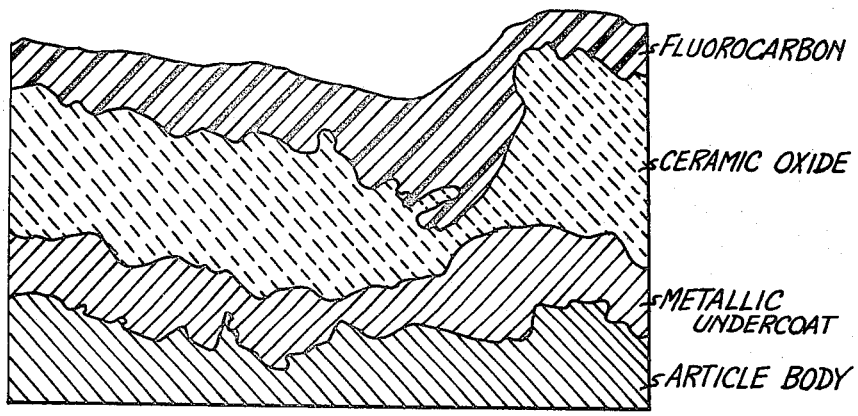
FIGURE 2 is a magnified cross section of the surface portion of an article to which a two-coat wear underlayer and a repellent overlayer have been applied.

The particular method which is most desirable to provide the desired wear-resistant repellent finish on a plate-type article depends to a considerable extent upon the condition of the body of the article to which the finish is to be applied and to some extent the type of material of which the body is made. If the body is contaminated with oils or solvents which remain from the manufacturing process employed in making the article it will be desirable to clean it with a suitable cleaning solvent. In severe cases it may be necessary to clean the body surface further by baking it in an oven to remove the oils and solvents. In some instances it has been necessary to bake the article at a temperature of 350° F. to 400° F. for two hours. Then it is desirable to clean the article by another solvent action such as by immersing it in a cleaning solvent bath or exposing it to trichloroethylene vapor for a period of five to ten minutes.

If the article is initially sufficiently clean or after it has been cleaned, it is usually desirable to roughen the surface of the area to be coated. The type of roughening procedure will be somewhat dependent upon the material of which the article body is made. Such body may be of ferrous metal such as sheet steel, stainless steel or cast iron or may be of aluminum or an aluminum alloy or may of copper or a copper alloy. These metals differ considerably in hardness but in each instance they have a melting point considerably higher than the temperature at which fluorocarbon material is fused. A satisfactory method of roughening the surface of such a metal article whether it be a bonding tool or a cooking utensil is by grit blasting.

It is preferred that the underlayer containing a ceramic oxide by applied by flame-spraying technique. The material applied to the plate-type article body is thus sprayed onto it in a molten or partially molten state. In order to reduce he possibility of cleavage between the applied material and the body of the article, therefore, it may be desirable to perheat the article body before the material is applied to it. The article body may be preheated by application of a flame to it but preferably it is preheated to a temperature of approximately 250° F. in an oven.

The ceramic oxide contained in the wear underlayer on the article may be any of various oxides which are suitable for flame-spraying. These include aluminum oxide (alumina), $Al_2O_3$, nickel oxide, NiO, titanium dioxide (titania), $TiO_2$, zirconium dioxide (zirconia), $ZrO_2$ and mixtures of such oxides. The ceramic oxide, or combination of oxides, most satisfactory for particular applications depends upon the properties desired, different coefficients of expansion of the ceramic material as compared to the material of the article body and the adhesion qualities of the ceramic material. Such ceramic oxide is flame-sprayed by use of an oxyacetylene flame-spraying gun in accordance with known techniques. The resulting underlayer has a minutely rugged exterior including sporadically distributed peaks. The thickness of the underlayer containing ceramic oxide will be a few thousands of an inch, such as .002 to .007 inch.

Improved bonding of ceramic oxide material to the surface of a metal body may be obtained by using a first coat of flame-sprayed metal to which a second coat of flame-sprayed ceramic oxide is applied. Where such a metallic undercoat is used it may be unnecessary, in order to obtain satisfactory adhesion, to roughen the surface of the metal article before such layer of metal is applied. Metal which may be flame-sprayed in powder or wire form for this purpose can be a nickel-chromium alloy, containing 80% of nickel and 20% of chromium by weight, molybdenum, nickel or aluminum. Even when such a metallic undercoat is applied to the surface of the metal article, it may be desirable for the article to be preheated before the coat is applied. Where such a metallic undercoat is used the ceramic oxide coat is applied by flame-spraying over the metallic coat in the same manner that it would be applied directly to the surface of the metal article. For such a two-coat underlayer, preferred constituents are nickel-chromium alloy for the first coat and aluminum-oxide ceramic for the second coat.

After the wear underlayer containing ceramic oxide has thus been applied to the article surface, it may be desirable to remove loosely adhering particles and extremely high crests by a light sanding operation, so that the fluorocarbon resin overlayer to be applied will cover essentially all of the wear layer peaks. Also, since the fluorocarbon resin overlayer is to be applied in the form of an aqueous suspension, the article should be allowed to cool approximately to room temperature before such fluorocarbon resin application in order to avoid conversion of the aqueous carrier into steam upon its contact with the surface of the underlayer.

A preferred type of permanent antiadherent or nonstick agent material overlayer to be applied to the wear underlayer is a fluorocarbon polymer such as polytetrafluoroethylene or a fluorinated ethylene propylene. The fluorocarbon resin may be deposited in conventional manner by spraying onto the wear underlayer an aqueous suspension of the fluorocarbon resin with an ordinary airspray gun such as customarily used for paint-spraying. For this purpose the fluorocarbon resin will be mixed with a carrier, preferably of aqueous type, of suitable consistency for spraying. A layer having an average thickness of about .001 inch of repellent material deposited as one or more coats usually is adequate.

Following deposition of the repellent overlayer, the article is heated to fuse the fluorocarbon resin. If the fluorocarbon resin is polytetrafluoroethylene, the article is heated at a temperature of approximately 725° F. for a period of twenty to forty minutes, depending on its bulk, to bring the overlayer to its fusing temperature. Fusing techniques for fluorocarbon resin are discussed in U.S. Patent No. 2,562,117, for example.

Figure 1:
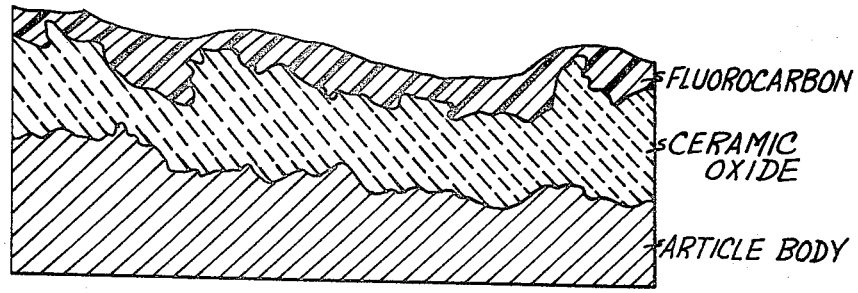
FIGURE 1 is a greatly magnified cross section of the surface portion of an article to which a single coat wear underlayer and a repellent overlayer have been applied.

It is thought that the fluorocarbon resin penetrates into the interstices of the wear underlayer to a subsanial degree by capillary action. This surface structure is illustrated representatively in the drawings. The plate-type body of the article 1, whether it be a bonding tool or a kitchen utensil, has a more or less rough surface to which the underlayer 3 containing the ceramic oxide is applied. The exterior of this oxide underlayer is quite rugged in miniature. The repellent material overlayer 4a lies principally in the depressions between the peaks of the wear layer and is anchored by such peaks and surface roughness of the ceramic oxide of the wear layer. The peaks of the wear layer, at least after initial wear, form outcroppings which are distributed throughout the surface of the finish and deter further wear and appreciable erosion of the antiadherent material. The area of the wear layer outcroppings constitutes a minor portion of the finish surface area and does not detract appreciably from the antiadherent quality of the finish surface. Obviously, the representative illustrations of this structure in the drawing is much enlarged and the illustrations of FIGURES 1 and 3 are much more highly magnified than that of FIGURE 2.

Figure 3:
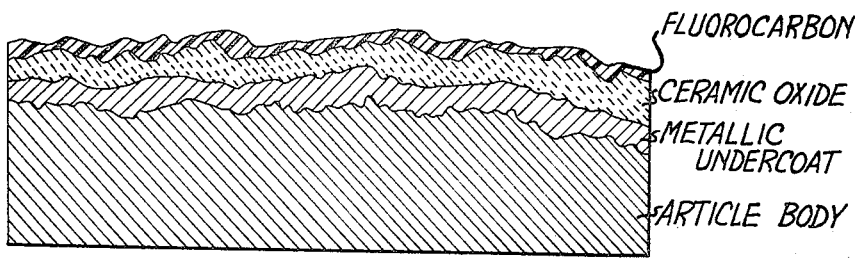
FIGURE 3 is a similar view of such surface portion of the article which is greatly magnified.

In FIGURES 2 and 3 an underlayer composed of an undercoat 3a of flame-sprayed metal and an outer coat 3b of flame-sprayed ceramic oxide is shown.

Figure 4:
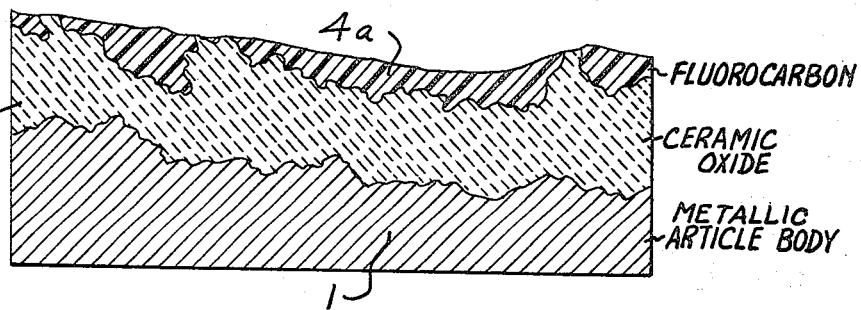
FIGURE 4 is a greatly-magnified cross section of the surface portion of an article to which the finish of FIGURE 1 has been applied after initial wear.
Figure 5:
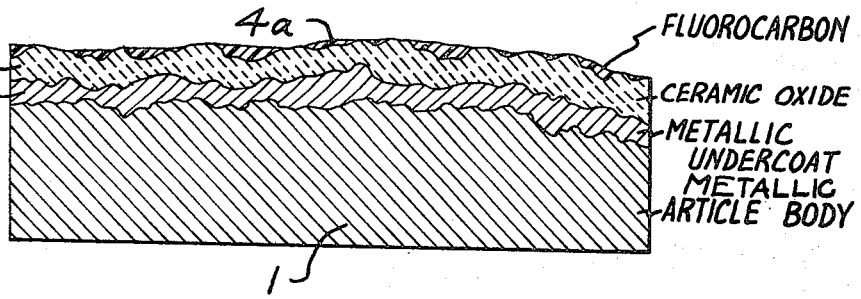
FIGURE 5 is a similar view of an article to which the finish like that shown in FIGURES 2 and 3 has been applied after initial wear.

The consequences of the penetration of the antiadherent resin material into the interstices of the wear layer is to combine the wear-resistant characteristics of the wear layer wih the repellent characteristics of the antiadherent. Thus, the fluorocarbon resin which is normally relatively soft is protected from excessive erosion by the outcroppings of the wear layer 3 in FIGURE 4 and 3a in FIGURE 5 which withstand the scraping or abrasion to which the finish is subjected and are surrounded by areas of the antiadherent or non-stick agent. The resultant surface is smooth and has a waxy texture which provides good wearing qualities and deters sticking.

The term "permanent" is used in the foregoing description and in the following claims to designate an antiadherent or non-stick resin which has a useful life comparable with the normal useful life of the article to which such resin is applied, such as tetrafluoroethylene, for example, as distinguished from temporary release coatings such as paraffins, graphite and waxes.

I claim as my invention:

1. A coated article comprising a plate-type body structure, a wear underlayer containing flame-sprayed ceramic oxide on said body structure and having a minutely-rugged exterior, and an overlayer of permanent antiadherent fluorocarbon resin applied over said wear underlayer and anchored thereto by the rugged exterior of said wear underlayer, said wear underlayer and said antiadherent resin overlayer cooperatively forming a wear-resistant repellent finish having, at least following initial wear, its exterior surface sporadically interrupted by a multiplicity of outcroppings of said wear underlayer distributed throughout such surface and constituting a minor portion of the finish surface area.

2. The coated article defined in claim 1, in which the wear underlayer includes alumina.

3. The coated article defined in claim 1, in which the wear underlayer includes a flame-sprayed metallic undercoat and a flame-sprayed ceramic oxide outer coat.

4. The coated article defined in claim 1, in which the fluorocarbon resin is polytetrafluoroethylene.

5. A process for applying a coating finish to an article, which comprises flame-spraying onto the article a wear underlayer containing ceramic oxide and having a minutely-rugged exterior, depositing on the wear underlayer an overlayer of permanent antiadherent fluorocarbon resin which overlayer is sufficiently thin for outcroppings of the wear underlayer to protrude therethrough at least following initial wear, and heating the article to fuse the antiadherent fluorocarbon resin.

6. The process defined in claim 5, in which the article is metal, and the flame-spraying includes, in forming the wear underlayer, flame-spraying a metallic undercoat and over such undercoat flame-spraying a second coat containing ceramic oxide.

7. The process defined in claim 5, including depositing the antiadherent fluorocarbon resin as an aqueous suspension of such material.

8. The process defined in claim 7, including spraying the aqueous fluorocarbon resin suspension onto the underlayer.

9. A cooking vessel comprising an aluminum plate body structure, a wear underlayer containing ceramic oxide applied over, and permanently united to, said aluminum body structure and having a minutely-rugged exterior, and permanent antiadherent resin applied over said wear underlayer and anchored thereto by the rugged exterior of said wear underlayer, said wear underlayer and said antiadherent resin cooperatively forming a food-engaging surface comprising minute areas of said wear underlayer surrounded by areas of said antiadherent resin.

References Cited

UNITED STATES PATENTS

| | | | |
|---|---|---|---|
| 3,052,590 | 9/1962 | Maros et al. | 156—289 |
| 2,488,446 | 11/1949 | Swiss | 18—47 |
| 2,567,162 | 9/1951 | Sanders | 117—232 X |
| 2,619,443 | 11/1952 | Robinson | 117—132 X |
| 2,688,182 | 9/1952 | Dorst | 117—232 X |
| 2,707,691 | 5/1955 | Wheildon | 117—105.2 |
| 2,688,182 | 9/1954 | Dorst | 117—232 X |
| 2,955,974 | 10/1960 | Allen et al. | 161—93 |
| 2,972,947 | 2/1961 | Fitzsimmons et al. | 117—132 X |
| 2,977,748 | 4/1961 | Zisman et al. | 117—161 X |
| 3,006,782 | 10/1961 | Wheildon | 29—195 X |
| 3,008,601 | 11/1961 | Cahne | 117—132 X |
| 3,165,179 | 1/1965 | Shapland | 117—94 X |

WILLIAM D. MARTIN, *Primary Examiner.*

THEODORE G. DAVIS, *Assistant Examiner.*

U.S. Cl. X.R.

117—49, 69, 71, 75, 105.2, 161; 161—189, 225; 220—64